S. E. CHEESEMAN.
CARTRIDGE LOADING IMPLEMENT.
No. 10,752. Reissued July 27, 1886.
Fig. 1.
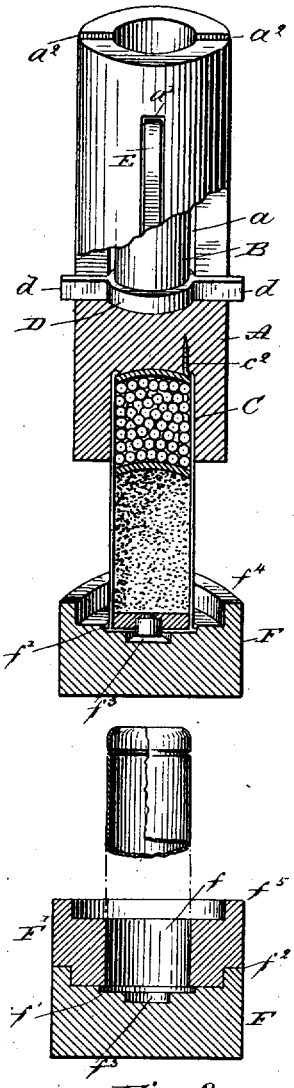
Fig. 3.
Fig. 2.
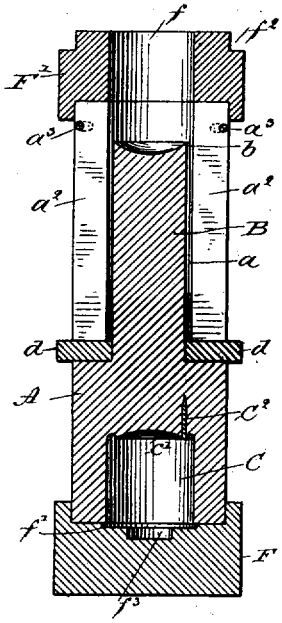
Fig. 5.
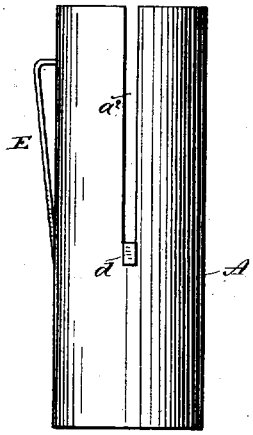
Fig. 4.
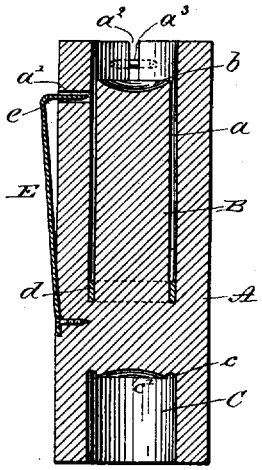
WITNESSES
S. L. C. Hasson
W. W. Gelatt
INVENTOR
S. E. Cheeseman
By his Attorney
Rich^d H. Manning Atty
N. PETERS, Photo-Lithographer, Washington, D. C.

UNITED STATES PATENT OFFICE.

SHERWOOD E. CHEESEMAN, OF KANSAS CITY, MISSOURI.

CARTRIDGE-LOADING IMPLEMENT.

SPECIFICATION forming part of Reissued Letters Patent No. 10,752, dated July 27, 1886.

Original No. 301,465, dated July 1, 1884. Application for reissue filed August 27, 1885. Serial No. 175,515.

*To all whom it may concern:*

Be it known that I, SHERWOOD E. CHEESEMAN, a citizen of the United States, residing at Kansas City, in the county of Jackson and State of Missouri, have invented a new and useful Improvement in Loading Implements for Cartridge-Shells; and I do hereby declare that the following is a full, clear, and exact description of the invention, which will enable others skilled in the art to which it appertains to make and use the same, reference being had to the accompanying drawings, forming part of this specification.

My invention has for its object an improvement in implements for the loading of cartridge-shells, in which all the essential devices for loading the shell are arranged within a small compass; and it consists in the novel construction and combination of its several parts, hereinafter more fully described, and specifically pointed out in the claims.

In the drawings, Figure 1 is a view, partly in perspective and partly in section, of my improved loading implement, with one end of a cartridge-shell resting in the base and the other inserted in the crimping devices. Fig. 2 is a sectional elevation of the same, with the loading-base and shell-support upon opposite ends. Fig. 3 is a view of the loading-base and shell-support when combined. Fig. 4 is a lateral view of the loading implement to that seen in Fig. 1, showing the spring-lever and cutting-blade and the perforation through which the latter is operated. Fig. 5 is a view of the implement from the side having the longitudinal transverse slot.

A represents the case of the loading implement, which, for convenience, is cylindrical in form.

*a* is a longitudinal cylindrical recess between the case A and the fixed central rammer, B.

*a'* is a transverse perforation through the side of case A, communicating with recess *a*.

$a^2$ $a^2$ are longitudinal transverse slots through the case A.

$a^3$ $a^3$ are staples over the slots $a^2$.

B is a fixed central rammer within the case A.

*b* is a concavity in the outer end of rammer B.

C is a longitudinal cylindrical opening in the opposite end of case A to rammer B.

*c* is a cylindrical groove in the implement and in the bottom of the opening C, forming the crimper.

*c'* represents the concave formation of the implement in the bottom of the opening C.

$c^2$ represents an upsetting-pin in the implement and in the bottom of the opening C, near the groove *c*.

D represents the cartridge-ejector, having the extensions *d d*.

E is a spring-lever on the outside of case A, and *e* a cutting-blade thereon within the recess *a'*.

F is a loading-base on the end of case A, having the cylindrical depressions, *f'* for the reception of the base of a cartridge-shell, and $f^3$ affording space for the primer.

F' represents a shell-supporter on the opposite end of case A, fitted thereto in the depression $f^5$, and is formed with longitudinal perforation *f*, to admit a cartridge-shell, and having a cylindrical rabbet, $f^2$, on the end opposite to that fitted to the case A, to fit the depression $f^4$ in the loading-base F.

My improved loading implement may be made from any suitable material, and in the most convenient shape.

In the construction of the wad-starter, I make in one end of the said implement a longitudinal cylindrical recess, *a*, extending from the outer end portion thereof inwardly to a sufficient depth, and in width equal to the thickness of one side of a cartridge-shell.

Within the recess *a* of the implement is formed a rammer, B, which is fixed centrally therein and to the case A. The end of the rammer B is then cut away laterally, leaving the same shorter in length than the recess *a*, and a concave depression, *b*, made therein. Two longitudinal slots, $a^2$ $a^2$, are then made in the side of case A, opposite to each other, and of equal length to and communicating with the recess *a*, between the case A and the rammer B. An ejector, D, is then formed, from suitable metal, in the shape of a collar, which is fitted to the circumference of the rammer B, over which and in the recess *a* of case A it is made to move freely. Two extensions, *d d*, are then formed upon the ejector D, which project laterally therefrom and through the slots $a^2$ $a^2$ in the side of the case A, which enable the ejector to be raised when desired.

In the outer side and near the end of case A, and extending across the slots $a^2$ $a^2$, I affix the staples $a^3$ $a^3$, which prevent the extensions $d$ $d$ of the ejector D being withdrawn therefrom. These staples are used whenever the material from which the implement is made is not subject to undue expansion and contraction from moisture or other causes. When made of wood or fibrous material, the longitudinal transverse slot $a^2$ will permit the introduction of a large or small shell and the slight expansion of the outer case sufficiently to prevent binding, and any retaining devices may be used to prevent the removal of the ejector in lieu of the staples. A spring-lever, E, is then made of a suitable length, one end of which is fastened to the case A by a suitable pin, and the cutting-blade $e$ attached flatwise and at right angles to its opposite end. A transverse opening, $a'$, is then formed for the cutting-blade $e$ in the side of case A, which communicates with the recess $a$ slightly below the end of rammer B, and the blade $e$ inserted therein.

In the construction of the crimping devices, I form in the opposite end of the implement to that provided with the rammer B a longitudinal cylindrical opening, C, of sufficient dimensions laterally to receive a cartridge-shell. A groove, $c$, concentric to the opening C, and having a slight increase in width over the thickness of one side of a cartridge-shell, is formed in the case A, extending longitudinally from the sides a slight distance below the bottom of the said opening C. The portion of the case A at the bottom of the opening C is then made with a concavity, $c'$, leaving a square shoulder near its joinder with the groove $c$. An upsetting-pin, $c^2$, is then rigidly fixed in the bottom of the opening C in the implement, and near the inner edge of groove $c$, the head of the pin extending a slight distance in the direction of the sides of said opening, at right angles to said pin and in a transverse relation to said groove.

In the construction of the loading-base I form a cylindrical cap-shaped device, F, which is provided with a longitudinal depression, $f^4$, adapted to fit one end of the case A. A smaller depression is then made in the base, in the same direction as the first, equal in depth to the thickness of the rim of the base of a cartridge-shell, and which is adapted to rest therein. A depression, $f^3$, of still smaller dimensions is also made in the base below the depression $f'$, which affords space for the primer when loading. A shell-supporter, F', is then made of a similar shape to the base F, and a longitudinal cylindrical perforation made entirely through the same equal to the circumference of a cartride-shell. In one end a longitudinal depression, $f^5$, is then made, which also is of equal circumference with the case A, and is fitted thereto when not in use. Upon the opposite end of the shell-supporter a cylindrical rabbet, $f^2$, is made, of equal dimensions to the depression $f^4$ in the loading-base, in which it is fitted.

In the operation of my invention, and in loading a cartridge-shell, the charge of powder having been deposited therein, a wad is placed in and below the mouth of the shell edgewise, leaving one edge the highest, which upon a slight pressure binds upon the sides of the shell. This insures the turning of the wad. The end of the shell provided with a primer is then placed in the base F perpendicularly thereto and in the depression $f'$ and its opposite end inserted in the recess $a$ of the loading implement. The concave end of rammer B being brought in contact with the wad, carries the same by pressure upon the implement firmly upon the powder and in its proper plane convexed, as seen in the drawings. The action of the concave end of the rammer upon the wad compresses the shot into a similar shape, thus producing a close and even distribution of the shot and concentrating the force of the powder. From the recess $a$, which affords a perfect wad-starter, the shell is then withdrawn and the shot inserted, after which a wad is placed over the same and convexed by the rammer B. While in this position in the recess $a$ the spring-lever E is operated, a slight pressure upon which throws the blade $e$ within the recess $a$ against the shell, which it penetrates, and also against the rammer B, gaging the cutting distance. The shell is then rotated, the cutting-blade $e$ removing the surplus end therefrom a slight distance outwardly from the wad. The shell is then removed from the recess, and the extensions $d$ $d$ of the ejector D thrown by the fingers in the direction of the concave end of rammer B, which removes the surplus end of the shell from the recess $a$. The open end of the cartridge-shell is then inserted in the longitudinal opening C of the implement which contains the crimping devices, the edges of which shell enter the cylindrical groove $c$ and are crimped by a blow from the hand. The shell is then rotated, and pressure applied to the crimped end of the shell, which is brought in contact with the head of the upsetting-pin $c^2$, which binds the inner edges thereof firmly upon the wad, by this means obtaining a firmer edge and the strongest resistance from the accidental removal of the charge.

To prevent the breaking of a second-grade shell near the base when loading I inclose the same in the supporter F', which fits over the shell in the opening $f'$ and the base F in the grooves $f^4$. The end of the shell is then placed in the recess $a$ of the loading implement and the spring-lever operated to indent the cartridge as it is rotated without separating the end beyond the indentation, as seen in Fig. 3. The open end of the cartridge-shell is then inserted in the crimping devices, and a very slight blow upon the implement throws the indented portion of the shell inwardly upon the wad as well as crimping the edge of the shell.

When not in use, the shell-supporter and the loading-base are fitted to the opposite ends of the case A of the implement, thus affording a compact, useful, and novel loading device.

Having fully described my invention, what I now claim as new, and desire to secure by Letters Patent, is—

1. In a loading implement for cartridge-shells, the combination, with an outer case, of a fixed central rammer having a concave depression in its outer end, and a longitudinal cylindrical recess between said case and rammer, as and for the purpose specified.

2. In a loading implement, the combination, with an outer case provided with longitudinal transverse slots, and having a fixed central rammer and a longitudinal cylindrical recess between said rammer and case, of an ejector within said recess having suitable extensions which are adapted to enter and slide in the slots in the case, as and for the purpose specified.

3. In a loading implement, the combination, with an outer case provided with a suitable longitudinal cylindrical opening and longitudinal transverse slots communicating therewith, and an ejector adapted to slide in said slots, of a retaining device attached to said case and across said slots, as described.

4. In a loading implement, the combination, with an outer case having a transverse perforation therein, a fixed central rammer, and a longitudinal cylindrical recess between said rammer and case communicating with said perforation, of a blade which is adapted to enter said perforation in the case, as and for the purpose specified.

5. In a loading implement, the combination, with an outer case having a transverse perforation therein, a fixed central rammer, and a longitudinal cylindrical recess between said rammer and case communicating with said perforation, of a spring-lever attached outwardly at one end to the case and provided with a blade at its opposite end, which is adapted to enter the transverse perforation in the said case, as and for the purpose specified.

6. The combination, in a loading implement provided with a longitudinal cylindrical opening extending a suitable distance therein, of an upsetting-pin rigidly fixed in said implement at the bottom and near the longitudinal side of said opening, and a head upon said pin extending at right angles to and slightly beyond the pin in the direction of the side of said opening and adapted to bind the inner edges of the shell, as shown and described.

7. The combination, in a loading implement provided with a longitudinal cylindrical opening extending a suitable distance therein, and a groove which is concentric to and extends longitudinally from the sides and a slight distance below the bottom of said opening, of an upsetting-pin rigidly fixed in said implement at the bottom of said opening and near the inner edge of said groove, and a head upon said pin extending at right angles to and slightly beyond the pin in the direction of the side of said opening and in a transverse relation to said groove, as and for the purpose specified.

SHERWOOD E. CHEESEMAN.

Witnesses:

FRED. W. PERKINS,
JAS. H. PRESTON.